US010331717B2

(12) United States Patent
Zhao et al.

(10) Patent No.: US 10,331,717 B2
(45) Date of Patent: Jun. 25, 2019

(54) METHOD AND APPARATUS FOR DETERMINING SIMILAR DOCUMENT SET TO TARGET DOCUMENT FROM A PLURALITY OF DOCUMENTS

(71) Applicant: EMC IP HOLDING COMPANY LLC, Hopkinton, MA (US)

(72) Inventors: Sean Kun Zhao, Shanghai (CN); Chao Chen, Shanghai (CN); Winston Lei Zhang, Shanghai (CN); Jingjing Liu, Shanghai (CN); Kun Wu Huang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 139 days.

(21) Appl. No.: 15/385,037

(22) Filed: Dec. 20, 2016

(65) Prior Publication Data

US 2017/0185671 A1 Jun. 29, 2017

(30) Foreign Application Priority Data

Dec. 29, 2015 (CN) .......................... 2015 1 1016976

(51) Int. Cl.
| G06F 16/00 | (2019.01) |
| G06F 16/33 | (2019.01) |
| G06F 16/93 | (2019.01) |
| G06F 16/31 | (2019.01) |
| G06F 17/21 | (2006.01) |

(52) U.S. Cl.
CPC .......... G06F 16/334 (2019.01); G06F 16/325 (2019.01); G06F 16/3347 (2019.01); G06F 16/93 (2019.01); G06F 17/21 (2013.01)

(58) Field of Classification Search
CPC .......................... G06F 17/30675; G06F 16/334
USPC ....................................................... 707/694
See application file for complete search history.

(56) References Cited

U.S. PATENT DOCUMENTS

| 5,864,855 | A | * | 1/1999 | Ruocco ................. G06F 16/355 |
| 9,852,337 | B1 | * | 12/2017 | van Rotterdam ....... G06F 16/93 |
| 2008/0195567 | A1 | * | 8/2008 | Chen ..................... G06N 5/022 706/46 |

\* cited by examiner

*Primary Examiner* — Chelcie L Daye
(74) *Attorney, Agent, or Firm* — Brian J. Colandreo; Heath M. Sargeant; holland & Knight LLP

(57) ABSTRACT

Embodiments of the present disclosure provide a method and an apparatus for determining a similar document set to a target document from a plurality of documents. Each of the multiple documents and the target document may include a plurality of words, and each of words corresponds to a different integer. The method comprises: for each document among the plurality of documents and the target document, obtaining a set of integers associated with a document based on a set of words associated with the document, converting the set of integers associated with the document into a vector with a same dimension based on a predefined conversion rule; and determining the similar document set based on differences between the corresponding vectors for the multiple documents and the vector for the target document.

20 Claims, 9 Drawing Sheets

METHOD AND APPARATUS FOR DETERMINING SIMILAR DOCUMENT SET TO TARGET DOCUMENT FROM A PLURALITY OF DOCUMENTS

RELATED APPLICATIONS

This application claim priority from Chinese Patent Application Number CN201511016976.9, filed on Dec. 29, 2015 at the State Intellectual Property Office, China, titled "METHOD AND APPARATUS FOR DETERMINING DOCUMENT SET SIMILAR TO TARGET DOCUMENT AMONG MULTIPLE DOCUMENTS," the contents of which is herein incorporated by reference in its entirety

FIELD OF THE INVENTION

Embodiments of the present disclosure generally relate to the technical field of computer, and more specifically relate to a method and an apparatus for determining a similar document set to a target document from a plurality of documents.

BACKGROUND OF THE INVENTION

Similar document search is a very useful feature for content management, content search and content recommendation. In various scenarios, a lot of applications need to find a similar document set to a target document from a huge amount of documents.

The typical solution is to calculate a similarity between the documents to be determined and the target document one by one, and then return those that satisfy similarity criteria. For example, keywords may be searched one by one according to an inverted index, and the intersection of the document sets obtained by each keyword searching is determined as the similar document set. However, if the number of the documents to be determined becomes larger and larger, the time cost by this method will become significant, and thereby it will be hard to finish the calculation within the time limit given by a user. Moreover, the method is deficient in aspects of performance and accuracy.

SUMMARY OF THE INVENTION

In consideration of the foregoing problem in the prior art, one of the objects of the embodiments of the present disclosure is to provide a method and an apparatus for determining a similar document set to a target document from a plurality of documents to solve the above problems as well as others in the prior art.

According to a first aspect of the present disclosure, there is provided a method for determining a similar document set to a target document from a plurality of documents. Each of the plurality of documents and the target document may comprise a plurality of words, and each of words may correspond to a different integer. The method may comprise: for each document among the plurality of documents and the target document, obtaining a set of integers associated with the document base on a set of words associated with the document, converting, based on a predefined conversion rule, the set of integers associated with the document into a vector with a same dimension; and determining the similar document set based on differences between the corresponding vectors for the plurality of documents and the vector for the target document.

In some embodiments, the method may further comprise: determining a plurality of similar document sets based on a plurality of predefined conversion rules; and determining an intersection of the plurality of similar document sets as a resulting similar document set.

In some embodiments, the method may further comprise: storing a plurality of vectors for each document from the plurality of documents with a multi-dimensional vector matrix, the plurality of vectors being obtained based on the plurality of predefined conversion rules, each of the predefined conversion rules corresponding to a different dimension of the vector matrix, and each vector corresponding to a coordinate value in the corresponding dimension.

In some embodiments, the method may further comprise: obtaining a plurality of vectors for a new document based on the plurality of predefined conversion rules; and storing the obtained plurality of vectors in the vector matrix. In some embodiments, the method may further comprise: storing the vector matrix using a hash map.

In some embodiments, the method may further comprise: marking coordinate values in each dimension of the vector matrix as null except coordinate values corresponding to the vectors for a document. In these embodiments, the method may further comprise: skipping the coordinate values marked as null in determining the similar document set.

In some embodiments, converting the set of integers into vectors based on the predefined conversion rule may comprise: obtaining a corresponding binary sequence for each integer in the set of integers; extracting consecutive N bits from the corresponding binary sequence, N being an integer greater than zero; converting the consecutive N bits into a decimal number, the decimal number being used to replace the corresponding integer to form an updated set of integers; and converting the updated set of integers into a bit vector with a bit length $2^N$ using a bitmap algorithm. In some embodiments, the method may further comprise: determining a plurality of similar document sets based on a plurality of predefined conversion rules, a plurality of non-overlapped consecutive N bits being extracted from the corresponding binary sequence to form the bit vector based on the plurality of the predefined conversion rules. In some embodiments, the bit length may be an integer multiple of eight.

In some embodiments, the method may further comprise: determining a similar document subset that is more accurate than the similar document by directly comparing the set of words associated with a document from the similar document set with the set of words associated with the target document.

In some embodiments, determining the similar document set based on differences between the vectors for the plurality of documents and the vector for the target document may comprise: determining a document set having a difference less than a predetermined threshold as the similar document set. In some embodiments, determining the similar document set may comprise: determining the first K documents having the least differences, K being an integer greater than zero.

In some embodiments, the method may further comprise: determining, based on the vector of the target document and the predetermined threshold, a value interval of vectors conforming the predetermined threshold; and determining a set of documents with vectors falling into the value interval as the similar document set. In some embodiments, the method may further comprise: increasing the predetermined threshold by a step of one such that the similar document set is determined as including a predetermined number of documents.

In some embodiments, the set of words associated with the document includes a set of keywords associated with the document. In some embodiments, the set of words associated with the document is determined using at least one of a Term Frequency statistic algorithm or a name entity extraction enhancement algorithm.

In some embodiments, the method may further comprise: adding the vectors into an index segment of a search engine to search the vectors through the search engine.

According to a second aspect of the present disclosure, there is provided an apparatus for determining a similar document set to a target document from a plurality of documents. Each of the plurality of documents and the target document includes a plurality of words, and each of words corresponds to a different integer. The apparatus comprises: an obtaining unit configured to, for each document among the plurality of documents and the target document, obtain a set of integers associated with the document based on a set of words associated with the document; a conversion unit configured to, for each document among the plurality of documents and the target document, convert the set of integers associated with the document into a vector with a same dimension based on a predefined conversion rule; and a determination unit configured to determine the similar document set based on differences between the vectors for the plurality of documents and the vector for the target document.

According to a third aspect of the present disclosure, there is provided a computer readable storage medium having computer readable program instructions stored thereon to perform the method according to the first aspect.

According to a fourth aspect, there is provided a computer system which may comprise the apparatus according to the second aspect.

Compared with the prior art, the embodiments of the present disclosure at least provide the followings advantages. Firstly, for performance, the embodiments of the present disclosure may quickly determine the similar documents even when the number of documents in the document set is remarkably large. Because the embodiments of the present disclosure can obtain the possible similar document sets by searching the similar vectors (also named as fingerprints in the present disclosure) associated with the documents, thereby reducing the number of similar document sets which are more accurate and needs to be calculated accurately at last. Secondly, for accuracy, the final result is more accurate than, that obtained using the method in prior art (e.g. the more-like-this search method by Lucene), because the embodiments of the present disclosure may use all keywords in the document to generate fingerprints.

BRIEF DESCRIPTION OF THE DRAWINGS

The above and other objects, features and advantages of the embodiments of the present disclosure will become easily understood by reading the following detailed description with reference to the accompanying drawings. In the drawings, a number of embodiments of the present disclosure are shown in an exemplary way, rather than in a limited way, wherein.

DETAILED DESCRIPTION

Figure 1:
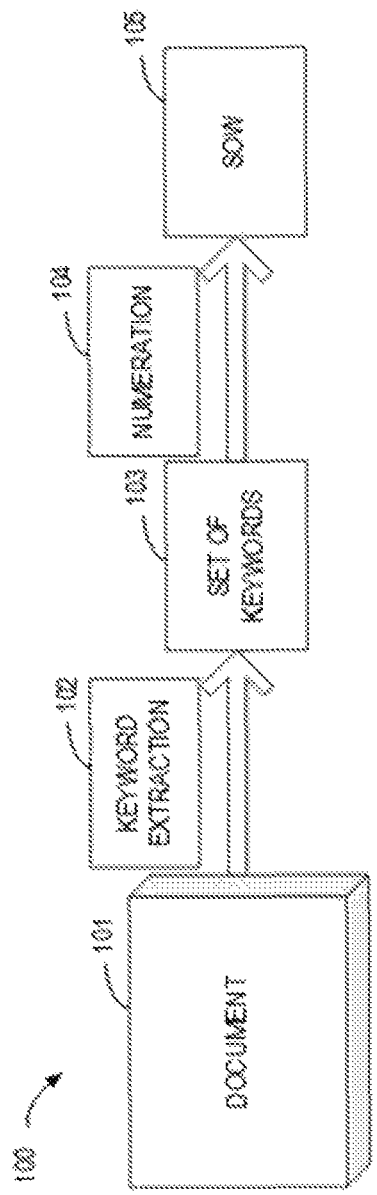
FIG. 1 schematically shows a process of converting a document to a numerical set of words.

Hereinafter, the principle and spirits of the present disclosure will be described with reference to a number of exemplary embodiments shown in the drawings. It should be understood that the description of these specific embodiments is only for enabling those skilled in the art to better understand the present disclosure, rather than limiting the scope of the present disclosure in any manner.

Similar document searching is a very useful feature for content management, content search and content recommendation. Considering that the similar documents are only a few documents in the document repository, a possible improvement is to obtain the possibly similar document sets quickly, and then check these candidate documents accurately. The present disclosure proposes a solution using fingerprint matrix to implement this conception.

Prior to introduction of the present disclosure in detail, terms used in the present disclosure are firstly defined.

In the context of the present disclosure, a vocabulary is all the words that the document may contain. In some embodiments, the size of the vocabulary can be reduced by selecting different strategies, e.g. selecting only nouns, verbs and significant adjectives to construct the vocabulary. In the context of the present disclosure, a document is the sequence of words in vocabulary, and in our model, a document is just the sequence of words, without punctuations and symbols. Further, in the context of the present disclosure, a document and another document may be used interchangeably.

In the context of the present disclosure, a set of keywords is the set of keywords of a document, which represents the content of the document. In the context of the present disclosure, a numerical method can map a word to an integer. Finally, a document can be represented as a set of integers. This set of integers can be denoted as $D_n$, and $D_n$ can be considered as the document itself. In the context of the present disclosure, a set of words (SOW) is a numerical representation of documents using the numeration method above. SOW comprises the set of integers which represent all the words in a document, without considering the repeat times and locations of words in the document. FIG. 1 schematically shows a process of converting a document to a numerical set of words. As shown in FIG. 1, a document 101 may obtain a set of keywords 103 by a keyword extraction 102, and the set of keywords 103 may obtain a SOW 105 by numeration 104.

In the context of the present disclosure, a document difference is used to quantify the difference between two documents. In some embodiments, the document difference function may be defined with different strategies. For instance, in an example of calculating the difference in a single direction between samples, if one document $D_0$ has keywords {Clinton, Republican, vote, White House}, and another document $D_1$ has {swing, campaigns, Clinton, Republican, Donald}, the document difference from $D_0$ to $D_1$ is diff($D_0$, $D_1$)=2 ($D_1$ does not have "vote" and "White House"), while the document difference from $D_1$ to $D_0$ is diff($D_1$, $D_0$)=3 ($D_0$ does not have "swing', "campaigns" and "Donald").

In the context of the present disclosure, a document difference threshold is used to define "how similar should two similar documents be". As in the previous example, if the document difference threshold is defined as 2, then $D_1$ is a similar document to $D_0$, while $D_0$ is not a similar document to $D_1$.

The problem of determining a similar document may be expressed as, given a document difference threshold M and a target document $D_t$, finding out a similar document set $SIM_M(D_t)$, wherein the difference between a document in $SIM_M(D_t)$ and the target document is no more than the threshold M.

$$SIM_M(D_t)=\{D_i|diff(D_t,D_i)\leq M, D_i \in \text{Repository}\} \quad (0)$$

The search of the first K similar documents is also a part of the problem, which is to derive the most similar K documents with formula (0).

Figure 2:
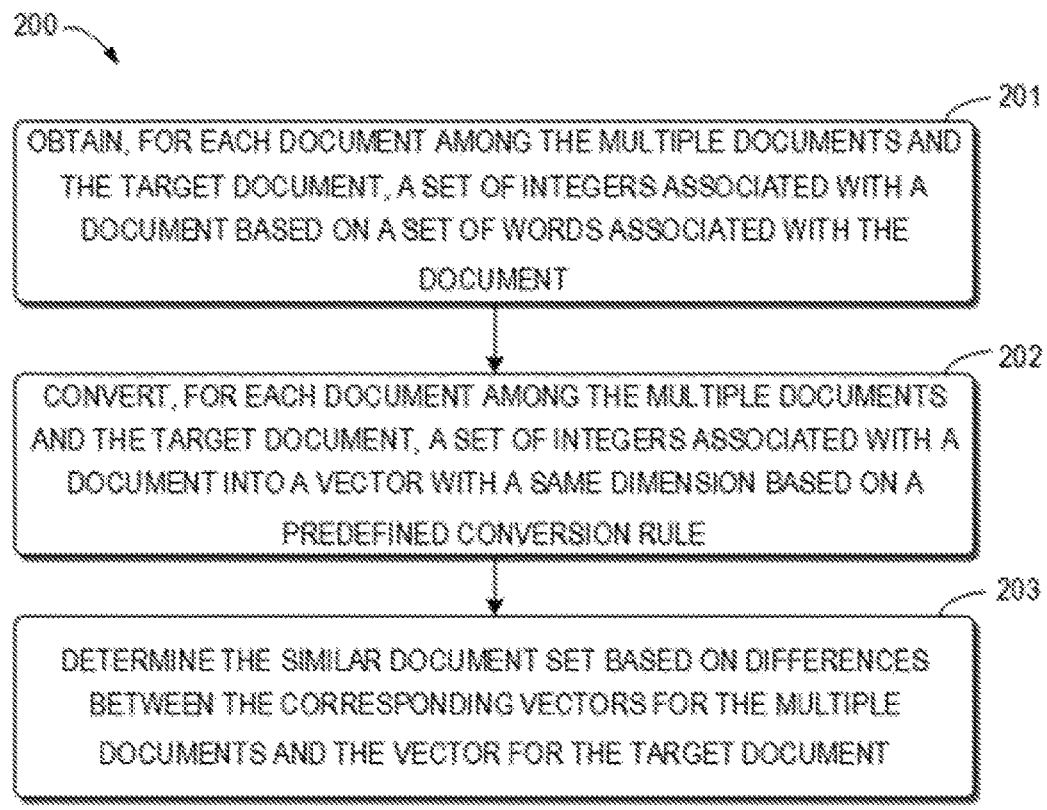
FIG. 2 schematically shows a flow chart of a method for determining a similar document set to a target document from a plurality of documents according to the embodiments of the present disclosure.

FIG. 2 schematically shows a flow chart of a method 200 for determining a similar document set to a target document from a plurality of documents according to the embodiments of the present disclosure. In some embodiments, each of the plurality of documents and the target document includes a plurality of words, and each of words corresponds to a different integer.

It should be appreciated by those skilled in the art that various methods may be used to map a word to an integer and map different words to different integers, so as to represent the document as a set of different integers. The present disclosure is not restricted in this aspect.

As shown in FIG. 2, the method 200 proceeds to the block 201 after being started. In the block 201, for each document among the multiple documents and the target document, a set of integers associated with the document can be obtained based on a set of words associated with the document.

In some embodiments, the set of words associated with the document may include a set of keywords of the document. In some embodiments, the set of words associated with the document may be determined through a Term Frequency statistic algorithm or a name entity extraction enhancement algorithm. It should be appreciated by those skilled in the art that a document may include a lot of details and noise information. Some extraction and refinement are needed to get the theme information of the document. The keyword extraction process may adopt a Term Frequency (TF) algorithm, a name entity extraction enhancement algorithm and so on. This part is not the focus of the present disclosure, and there are many other methods to get what we want.

In a particular embodiment, a specific example of converting a set of words associated with a document into a set of integers is provided to elaborate the object of the present disclosure. In this specific example, $D_0$ has an associated set of words {Clinton, Republic, vote, White House}, and $D_1$ has an associated set of words {swing, campaigns, Clinton, Republican, Donald}. According to a predefined mapping rule, the sets of words above can be converted into sets of integers.

$D_0$: {Clinton, Republican, vote, White House}→$D_0$:{44, 17, 28, 6}

$D_1$: {swing, campaigns. Clinton, Republican, Donald}→ $D_1$: {81, 63, 44, 17, 79}

Wherein, the integer corresponding to each word is predefined. The present disclosure does not limit how the words are mapped into integers, and it is feasible so long as there is such a predefined mapping relation.

Moreover, those skilled in the art should understand that, although the above describes the examples with English words for illustration, the embodiments of the present disclosure may be equally applied to technical scenarios with other languages.

Next, after the block 201, the method 200 may proceed to the block 202. In the block 202, for each document, the set of integers associated may be converted into a vector with a same dimension based, on a predefined conversion rule. In the context of the present disclosure, the vector associated with a document may be called as a fingerprint of the document, and in the context of the present disclosure, "vector" and "fingerprint" may be used interchangeably. It should be appreciated by those skilled in the art that the fingerprint is abstract information of the set of integers to some extent. Therefore, the fingerprint of a document may be used to determine a similar document set. It should also be appreciated by those skilled in the art that, though a bit vector is mainly adopted herein to expound the embodiments of the present disclosure in detail, other vectors obtained by converting a set of integers according to a predefined conversion rule may also be equally implemented for the embodiments of the present disclosure.

In some embodiments, the method 200 may further comprise: determining a plurality of similar document sets according to a plurality of predefined conversion rules; and determining an intersection of the plurality of similar document sets as a resulting similar document set.

It should be appreciated by those skilled in the art that, though the fingerprint of the document may carry information of the original set of integers, such information has limitations. For a predefined conversion rule, different sets of integers may correspond to a same fingerprint. Hence, in order to make results of the method 200 more accurate, a plurality of different predefined conversion rules may be used to respectively generate a plurality of different fingerprints for a certain document. Through different fingerprints, different similar document sets may be obtained respectively. Then, the intersection of the plurality of similar document sets may be determined as a resulting similar document set, thereby improving the accuracy of the result.

Figure 3:
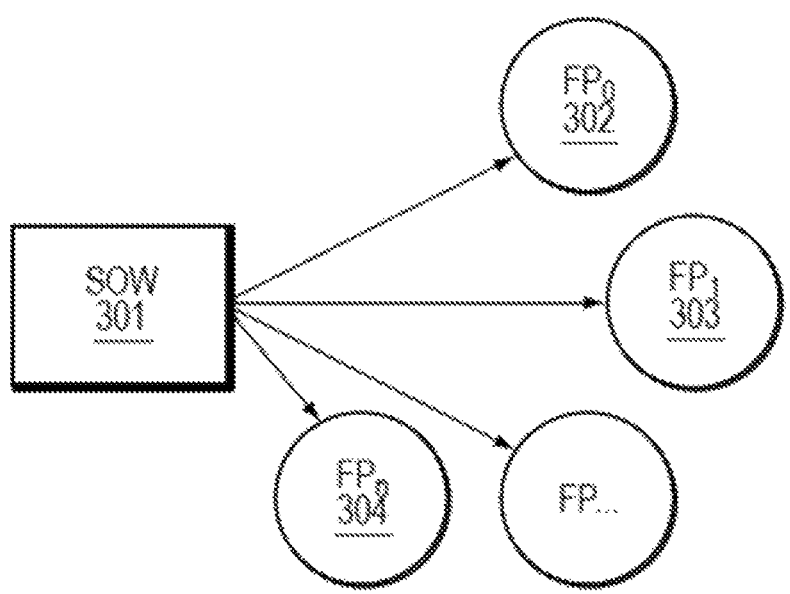
FIG. 3 schematically shows a schematic diagram of extracting fingerprints from a numerical set of words according to the embodiments of the present disclosure.

FIG. 3 schematically shows a schematic diagram of extracting a fingerprint from a numerical set of words according to the embodiments of the present disclosure. As shown in FIG. 3, after determining a set of words (e.g., a set of keywords) associated with a document, the set of words may be represented as a set of integers which is represented as SOW 301 in FIG. 3. Next, a plurality of fingerprints may be extracted from the SOW 301 based on a predefined conversion rule. In FIG. 3, these fingerprints are represented by $FP_0 302$, $FP_1 303$, $FP_n 304$, etc. Moreover, the fingerprints may be extracted from the original document.

These fingerprints can help users to quickly locate similar documents, and users can choose to use a plurality of fingerprints to ensure effectiveness and non-redundancy. The fingerprint conversion rule can be used to normalize the document or integer sets with different lengths into vectors with a same dimension, particularly into bit vectors with a same bit length. This means that this process will fairly keep information of each word in the set of words associated with the document, without roughly dividing the number of words.

In some embodiments, the predefined conversion rule in the method 200 may comprise: obtaining a corresponding binary sequence for each integer in the set of integers; extracting consecutive N bits from the corresponding binary sequence, wherein N is an integer greater than zero; converting the consecutive N bits into a decimal number, the decimal number is used to replace the corresponding integer to form an updated set of integers; and converting the updated set of integers into a bit vectors with a bit length $2^N$ using a bitmap algorithm.

In some embodiments, a plurality of similar document sets can be determined based on a plurality of predefined conversion rules, wherein the plurality of predefined conversion rules respectively extract a plurality of non-overlapped consecutive N bits of the corresponding binary sequence to obtain the corresponding bit vector.

In a particular embodiment, lower 2 bit segment of binary representation may serve as an extraction function of the fingerprint −0, and 2-3 bit segment of binary representation may serve as an extraction function of another fingerprint −1.

In this particular embodiment, for the specific example given above, there may be the following "fingerprint" extracting process.

$$D_0: \{44, 17, 28, 6\} \xRightarrow{FP} FP_0(D_0) = \{0, 1, 0, 2\} \xrightarrow{bitmap} 0111_2,$$

$$FP_1(D_0): \{3, 0, 3, 1\} \xrightarrow{bitmap} 1011_2$$

$$D_1: \{87, 63, 44, 17, 79\} \xRightarrow{FP} FP_0(D_1) = \{3, 3, 0, 1, 3\} \xrightarrow{bitmap} 1011_2,$$

$$FP_1(D_1): \{1, 3, 3, 0, 3\} \xrightarrow{bitmap} 1011_2$$

In such conversion, the bitmap algorithm means that, 1 in the obtained bit vectors indicates that the converted set of integers comprises the number represented by this bit, and 0 indicates that the converted set of integers does not comprise the number represented by this bit. For example, since $\{0, 1, 0, 2\}$ comprises 0, 1 and 2, and the 1st, 2nd and 3rd bits of the bit vector $0111_2$ are 1, while since $\{0, 1, 0, 2\}$ does not comprise 3, the 4th bit of the bit vector $0111_2$ is 0.

In other words, in this particular embodiment, the "fingerprint" 0 of the document $D_0$ may be "$0111_2$", and the "fingerprint" 1 may be "$1011_2$". The "fingerprint" 0 of the document $D_1$ may be "$1011_2$", and the "fingerprint" 1 may be "$1011_2$". It can be seen from this example that the sets of integers $D_0$ and $D_1$ with different lengths are finally converted to bit vectors with a same bit length. This is advantageous to determination of differences between fingerprints of different documents in the following steps. In some embodiments, the bit length may be an integer multiple of eight.

In some embodiments, a multi-dimensional vector matrix may be used to store a plurality of vectors of each document of a plurality of documents, the plurality of vectors are obtained through a plurality of predefined conversion rules, each predefined conversion rule corresponds to a different dimension of a vector matrix, and each vector corresponds to a coordinate value in the corresponding dimension. In these embodiments, if a fingerprint is stored in a fingerprint matrix, each point in the fingerprint matrix may store a list of document reference numbers with a same fingerprint combination.

Figure 4:
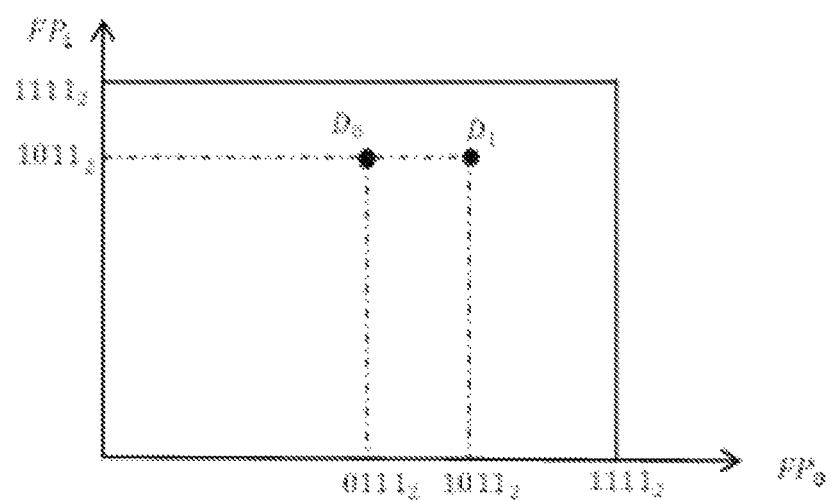
FIG. 4 schematically shows a schematic diagram of representing a document using a two-dimensional fingerprint matrix according to the embodiments of the present disclosure.

FIG. 4 schematically shows a schematic diagram of representing a document using a two-dimensional fingerprint matrix according to the embodiments of the present disclosure. As shown in FIG. 4, for the particular embodiment above, the document $D_0$ and the document $D_1$ may use two of their respective fingerprints as coordinates in the corresponding dimension to be stored in the fingerprint matrix.

Besides the two-dimensional fingerprints, in other embodiments, the fingerprint matrix with higher dimensions may be used to provide a quick search capability to access these fingerprints. As stated above, the fingerprint matrix is a matrix using each fingerprint $FP_i$ as its dimension. For sake of illustration, examples of three-dimensional fingerprints are given below, which means that three different fingerprints are extracted in the fingerprint extracting process.

Figure 6:
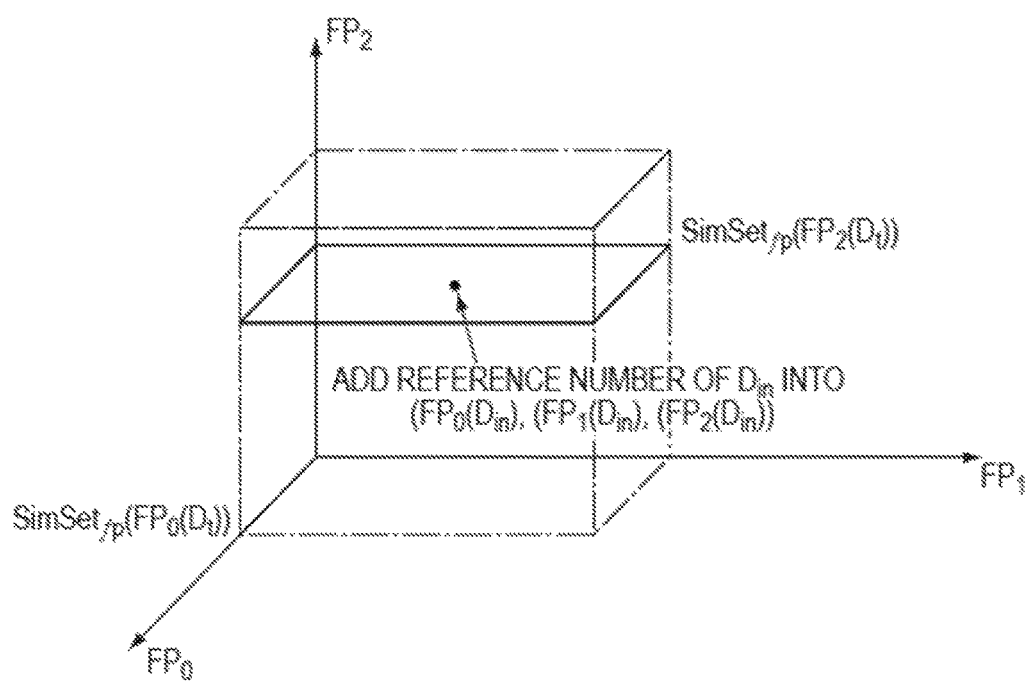
FIG. 6 schematically shows a schematic diagram of adding a new document into a three-dimensional fingerprint matrix according to the embodiments of the present disclosure.

FIG. 6 schematically shows a schematic diagram of adding a new document into a three-dimensional fingerprint matrix according to the embodiments of the present disclosure. As shown in FIG. 6, according to a plurality of predefined conversion rules, the corresponding plurality of vectors are obtained for a new document, and the obtained vectors are stored in a vector matrix.

Specifically, in order to insert a new document $D_{in}$ into the fingerprint matrix, the reference number of this document may be added into this matrix using the fingerprint $FPMATRIX[FP_0(D_{in})][FP_1(D_{in})][FP_2(D_{in})]$ as the coordinate.

In some embodiments, coordinate values in each dimension may be marked as null except those corresponding to vectors of a document. For instance, if there is no document having a fingerprint value for example $FP_0=B$, this fingerprint value will be marked as null. Null coordinate values in the fingerprint matrix may be skipped using this mark, thereby accelerating the search process of similar documents. Hence, in some embodiments, the coordinate values marked as null may be not taken into consideration in determining the similar document set.

In the method 200, a fingerprint of a document may be used as a locator, which means it needs only time cost of order O(1) to search a fingerprint combination of a certain document. Moreover, such manner ensures that the documents with a same fingerprint combination or their reference numbers may be placed in the same location in a matrix.

Further, there are two ways to store a fingerprint matrix. The first one is original store, which stores the whole fingerprint matrix space and stores a document list in this fingerprint matrix space. The second one is HashMap store, which uses fingerprint combination as its key and stores fingerprint combination in this map, which is useful to compress the matrix size in sparse cases. For the new document mentioned above, the fingerprints ($FP_0(D_{in})$, $FP_1(D_{in})$ ... $FP_n(D_{in})$) of the new document may be used as the key, which may be stored into HashMap to compress the matrix space. Therefore, in some embodiments, the HashMap may be used to store the vector matrix.

In these two store ways, the original store has an advantage about searching time, because it is a concise matrix and the access to itself is direct, but it wastes a lot of store space for storing the null fingerprints combination. By contrast, the HashMap store may greatly compress this store space.

Next, after performing block 202, the method 200 proceeds to block 203. In block 203, a similar document set can be determined based on differences between the corresponding vectors for the plurality of documents and the vector for the target document. As stated above, a vector for a document partially reflect information of a set of words associated with the document. As further described above, no matter how many words there are in a set of words associated with a document, vectors of documents all have the same dimension. Therefore, if differences between vectors of documents are determined by comparing vectors of different documents, the similar document set to the target document can be determined.

In some embodiments, the block 203 may further include: determining a document set having a difference less than a predetermined threshold as the similar document set. Those skilled in the art may understand that the predetermined threshold may be preset according to the specific technical scenario and requirements. By adjusting this predetermined threshold, a similarity between the determined similar document set and the target document, as well as the number of documents in the determined similar document set, can be adjusted.

In some scenarios, in a case of a certain predetermined threshold being used, a required predetermined number of similar documents may not be found. In these scenarios, the predetermined threshold may be increased by a step of one, so as to make the similar document set include the predetermined number of documents.

In the specific process of determining similar documents, a value interval of vectors conforming the predetermined threshold can be determined based on the vector for the target document and the predetermined threshold, and a set of document with vectors falling into the value interval is determined as the similar document set.

Figure 5:
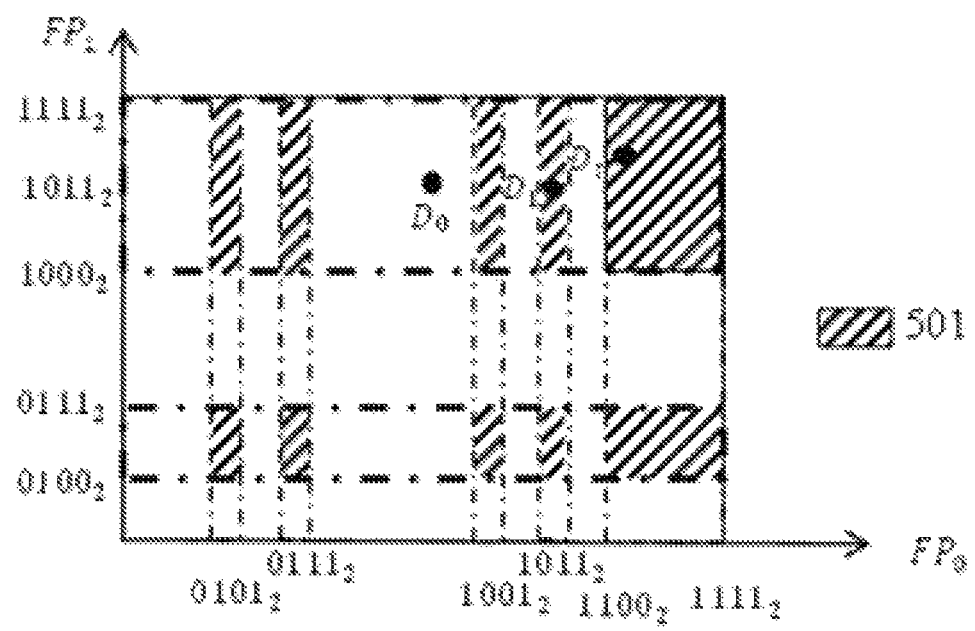
FIG. 5 schematically shows a schematic diagram of searching a similar document using a two-dimensional fingerprint matrix according to the embodiment of the present disclosure.
Figure 7:
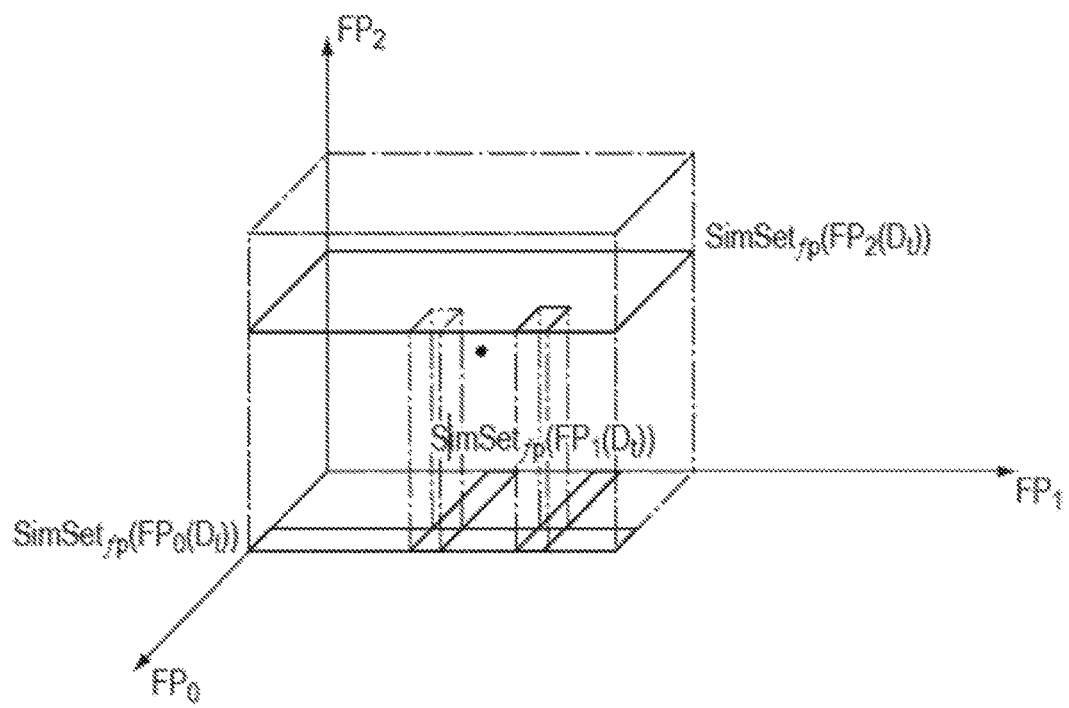
FIG. 7 schematically shows a schematic diagram of searching a similar document using a three-dimensional fingerprint matrix according to the embodiments of the present disclosure.

Referring to FIG. 5 and FIG. 7, the process of determining the similar document set will be detailed hereinafter through a two-dimensional fingerprint matrix and a three-dimensional fingerprint matrix.

FIG. 5 schematically shows a schematic diagram of searching a similar document using a two-dimensional fingerprint matrix according to the embodiments of the present disclosure.

According to embodiments of the present disclosure, in the stage of searching a similar document, all possible similar documents can be found through a fingerprint combination. In one specific example, the target document may be assumed as: $D_t$: {Clinton, campaigns, Virginia, Donald}={44, 63, 26, 79}, and the document difference threshold M may be 1.

First, the fingerprints of $D_t$ may be calculated as follows:

$$D_t: \{44, 63, 26, 79\} \xrightarrow{FP} FP_0(D_t) = \{0, 3, 2, 3\} \xrightarrow{bitmap} 1101_2,$$

$$FP_1(D_t): \{3, 3, 2, 3\} \xrightarrow{bitmap} 1100_2,$$

wherein the function $FP_0$ may extract the lowest two bits of the binary representation of each integer, and make the extracted two bits being represented in decimal. Specifically, the integers 44, 63, 26 and 79 are respectively converted into 0, 3, 2 and 3. Next, the set of integers {0, 3, 2, 3} is converted into a bit vector $1101_2$ through the bitmap algorithm. In such conversion, 1 in the bit vector indicates that the converted set of integers includes the number represented by this bit, and 0 indicates that the converted set of integers does not include the number represented by the bit. For instance, as {0, 3, 2, 3} includes 0, 2, 3, the first and fourth bits of the bit vector $1101_2$ are 1; however, as {0, 3, 2, 3} does not include 1, the second bit of the bit vector $1101_2$.

Likewise, the extraction function $FP_1$ may extract the second lowest two bits of the binary representation of each integer, and then a similar process is used to obtain another bit vector $1100_2$.

Then, the possible fingerprints of the document satisfying the similar conditions may be constructed based on the bit vector for the target document and the document difference threshold M. In this process, a wildcard "?" may be used to indicate that a bit can be 0 or 1. Moreover, in constructing possible fingerprints, only the bit of 1 in the fingerprints of the target document is, required to be considered, without considering the bit of 0. In this way, for the function $FP_0$, the possible similar document set represented by the fingerprints may be derived as follows: $SIM_{M=1,FP0}(D_t)=\{11?\ I_2, 11?\ 0_2, 10?1_2, 01?1_2\}$; for $FP_1$, the possible similar document set represented by the fingerprints may be obtained as follows: $SIM_{M=1,Fp1}(Dt)=\{11??_2, 10??_2, 01??_2\}$.

The area 501 depicted in FIG. 5 represents the area where the documents similar to the target document $D_t$ are located, these documents are represented in the two-dimensional fingerprint matrix, and this area is an intersection of possible similar document sets determined through two fingerprints. As shown in FIG. 5, the document $D_0$ in the particular example mentioned above is located outside of this search area, and the document $D_1$ is within this search area. diff($D_t$, $D_0$)=3, diff($D_t$, $D_1$)=1, which is anastomotic to the result obtained by comparing the similarity therebetween.

Finally, it may be detected in a conventional way that the keyword in D1 satisfies the similarity requirement of the specific scenario. When the number of documents is increased, the calculation process above has a remarkably lower cost than one-by-one comparison. Hence, in some embodiments, a similar document subset that is more accurate than the similar document set may be determined by directly comparing a set of words associated with a document in the similar document set with the set of words associated with the target document.

FIG. 7 schematically shows a schematic diagram of searching a similar document using a three-dimensional fingerprint matrix according to the embodiments of the present disclosure.

As shown in FIG. 7, the process of searching similar documents starts from fingerprint calculation for the target document: $FP_0$ ($D_t$), $FP_1$ ($D_t$), $FP_2$ ($D_t$), . . . . Then, the possible fingerprints within the threshold M will be calculated: $SIM_{M,FPi}(D_t)=\{fp\Box bitdiff(FP_1(D_t), fp)\leq M, fp\Box FP_i\}$. This step will exclude those fingerprints which have a difference greater than M.

As stated above, in this process, the search can be speeded up by filtering fingerprints marked as null. If a fingerprint is marked as null, it means that no document has this fingerprint, so there is no need to search this fingerprint.

The previous search is performed for each of the plurality of fingerprints, and then all sets of similar fingerprint can be obtained. Next, according to the formula (4), the similar document set derived based on the plurality of fingerprint combinations may be obtained: $SIM_M(D_t) \subseteq \cap_{i=1}^n SIM_{M,FP_i}(D_t)$.

It can be seen that, by the method according to the embodiments of the present disclosure, the scope of the similar documents that need to be queried is greatly reduced, and the final similarity calculation process can be proceeded to filter the false-positive cases.

Moreover, the problem of determining the first K of most similar documents will be much easier in the model of the present disclosure. Start from M=0, and in this case, a perfect match for the used fingerprint will be found. If the size of the similar document set is less than K, the threshold M may be loosened one by one, and meanwhile, it is checked whether the size of the resulting similar document set is large enough. If the required predetermined number K is satisfied, then return the K similar documents. Therefore, in some embodiments, the method 200 may determine the first K documents with the least difference, wherein K is an integer greater than zero.

In some embodiments, vectors may be added into an index segment of a search engine, so as to search the vectors through the search engine. It should be appreciated by those skilled in the art that, the conventional search engine based on the inverted index is better than the general search, and it is an attractive feature that the search for similar document can be integrated with the conventional search engine. To integrate the method of the present disclosure within the search engine, all the fingerprints may be stored in the index fields of the search engine. In the search stage, "AND" clause may be used to search a particular fingerprint combination.

After performing the block 203, the method 200 may be ended.

Hereinafter, the theoretical derivation associated with the method according to the embodiments of the present disclosure will be given to prove the correctness and feasibility of the embodiments of the present disclosure. It should be appreciated by those skilled in the art, in the following derivation process, particular scenarios or expressions may be used, and these particular scenarios or expressions are only used for explanation rather than limitation to the embodiments of the present disclosure.

In a general scenario, the SOW of a document may be represented by a huge number of bit sets, so it needs to use a space with the size of the vocabulary bit to store a SOW. However, the SOW of a document generally is a sparse bit set, because keywords of a document is very few compared with the whole vocabulary. Therefore, the present disclosure alternately uses a set of integers $D_n = \{w_{n0}, w_{n1}, \ldots, w_{nk}\}$ to represent a document.

Generally, each (mathematic) function FP(x) may have the following nature: $x_0 = x_1 \Rightarrow f(x_0) = f(x_1)$. Accordingly, the function for extracting fingerprints in the present disclosure may also have the following nature: $w_0 = w_1 \Rightarrow FP(w_0) = FP(w_1)$ and $FP(w_0) \neq FP(w_1) \Rightarrow w_0 \neq w_1$ (1). For example, in the particular embodiment mentioned above in which the lower 2 bits segment are used as the function for extracting fingerprints, there may be: $2 \neq 1 \Leftrightarrow FP_{0\sim1}(46) \neq FP_{0\sim1}(17) \Rightarrow 46 \neq 17$.

Accordingly, in the particular embodiments of the present disclosure, the bit segment function may be used as the function for extracting fingerprints. In the particular example given above, the numerical form of the set of keywords $D_0$: {Clinton, Republican, vote, White House} can be represented as: $D_0 = \{44, 17, 28, 6\}$. In some embodiments, this numerical conversion may be based on the conventional vocabulary table.

Based on the formula (1) and the nature of bit vector, it is easy to obtain the following formula:

$$\text{bit}diff(FP_i(D_0), FP_i(D_1)) \leq diff(D_0, D_1) \quad (2),$$

wherein the function $bitdiff(I_0, I_1)$ may be such a function that proceeds to count for the bit combination where $I_0$ is 1 and $I_1$ is 0.

A similar fingerprint set with a document difference threshold M to the target document $D_t$ is defined as follows:

$$SIM_{M,FP_i}(D_t) = \{D_i | \text{bit}diff(FP_i(D_t), FP_i(D_i)) \leq M, D_i \in \text{Repository}\}.$$

Based on the formula (0) and the formula (2), the similar document set $SIM_M(D_t)$ must be a subset of $$SIM_{M,FP_i}(D_t): SIM_M(D_t) \subseteq SIM_{M,FP_i}(D_t) \quad (3)$$

If there are n fingerprints, it can be obtained from the formula (3) that:

$$SIM_M(D_t) \subseteq \cap_{i=1}^{n} SIM_{M,FP_i}(D_t) \quad (4).$$

By formula (4) above, the search scope of the similar document sets can be reduced by using the intersection of the similar fingerprint sets.

In a brief summary, the present disclosure provides a new method using a solution of a fingerprint matrix to find similar documents. The method ensures that the documents with same keywords will be returned at a speed of O(1), and the method tolerates some false-positive documents so as to obtain better performances. The main steps of the solution as proposed in the present disclosure may be roughly divided into three parts: firstly, fingerprint extraction: a fixed number of fingerprints will be extracted from documents. Each fingerprint has a same bit length, which is generally an integer multiple of eight bits, like 8 bits, 32 bits, and so on. Secondly, fingerprint matrix construction: these fingerprints will be stored in a fingerprint matrix. The dimension of this matrix is determined by a fixed number of the fingerprints. Thirdly, similar document search: the similar documents to the target document will be obtained using the fingerprint matrix.

The present disclosure provides a mechanism which quickly searches all the documents within the document difference threshold condition with an acceptable false-positive probability. It may generate several fingerprints for each document, and store these fingerprints in a data structure named fingerprint matrix. During similar document search, the fingerprint matrix can reduce the search scope in a quite fast speed. In the searching time, by calculating the fingerprint of the target document, the fingerprint matrix can quickly find out the storage area which might comprise similar documents, and exclude traversal of dissimilar paths.

Figure 8:
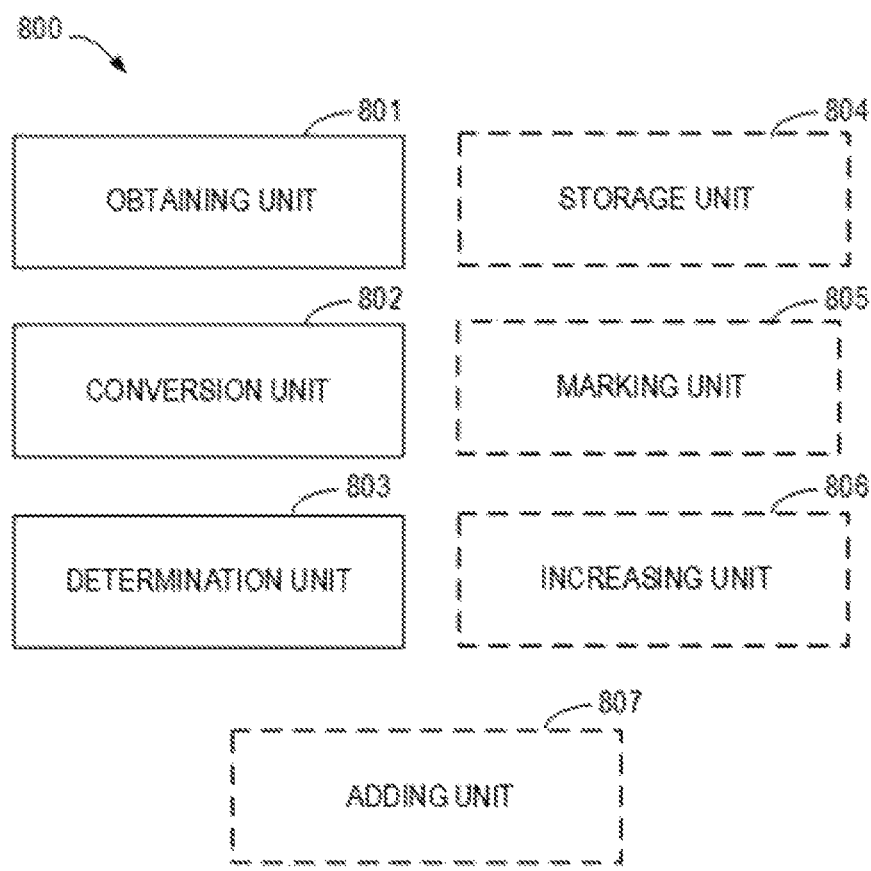
FIG. 8 schematically shows a block diagram of an apparatus for determining a similar document set to a target document from a plurality of documents according to the embodiments of the present disclosure.

FIG. 8 schematically shows a block diagram of an apparatus 800 for determining a similar document set to a target document from a plurality of documents according to the embodiments of the present disclosure. In some embodiments, each of the plurality of documents and the target document may comprise a plurality of words, and each of words may correspond to a different integer. In FIG. 8, dotted blocks are used to indicate optional units.

Those skilled in the art may understand that FIG. 8 only shows the units or components, in the apparatus 800, closely related to the embodiments of the present disclosure, and in the specific implementation, the apparatus 800 may comprise other function units or components to enable its normal operation. Besides, those skilled in the art may also understand that there are necessary connections among the units of the apparatus 800.

As shown in FIG. 8, the apparatus 800 may comprise an obtaining unit 801, a conversion unit 802, and, a determination unit 803.

In some embodiments, the obtaining unit 801 may be configured to, for each document among the plurality of documents and the target document, obtain a set of integers associated with a documents based on a set of words associated with the documents. In some embodiments, the set of words associated with the document may comprise a set of keywords of the document. In some embodiments, the set of words associated with the document may be determined through a Term-Frequency statistic algorithm or a name entity enhancement algorithm.

In some embodiments, the conversion unit 802 may be configured to convert the set of integers associated with each document into vectors with a same dimension based on a predefined conversion rule. The determination unit 803 may be configured to determine a similar document set based on differences between the corresponding vectors for the plurality of documents and the vector for the target document. In some embodiment, the bit length may be an integer multiple of eight. In some embodiments, the determination unit 803 may be further configured to: determine the first K documents with the least differences, wherein K is an integer greater than zero.

In some embodiments, the conversion unit 802 and the determination unit 803 may be further configured to: determine a plurality of similar document sets based on the plurality of predefined conversion rules, and determine an intersection of the plurality of similar document sets as a resulting similar document set.

In some embodiments, the apparatus 800 may further comprise a storage unit 804. The storage unit 804 may be configured to store a plurality of vectors of a document from a plurality of documents using a multi-dimensional vector matrix, the plurality of vectors are obtained through a plurality of predefined conversion rules, each predefined conversion rule corresponds to a different dimension of a vector matrix, and each vector corresponds to a coordinate value in the corresponding dimension.

In some embodiments, the conversion unit 802 may be further configured to obtain the corresponding plurality of vectors for a new document based on a plurality of predefined conversion rules. In these embodiments, the storage unit 804 may be further configured to store the obtained plurality of vectors in the vector matrix.

In some embodiments, the apparatus 800 may further comprise a marking unit 805. The marking unit 805 may be configured to mark coordinate values as null except coordinate values corresponding to vectors of a document in each dimension. In these embodiments, the determination unit 803 may be further configured to: skip the coordinate values marked as null in determining the similar document set.

In some embodiments, the storage unit 804 may be further configured to: store the vector matrix using a hash map.

In some embodiments, the conversion unit 802 may include: obtaining a corresponding binary sequence for each integer in a set of integers; extracting consecutive N bits of the corresponding binary sequence, wherein N is an integer greater than zero; converting the consecutive N bits into a decimal number, the decimal number is used to replace the corresponding integer to form an updated set of integers; and converting the updated set of integers into vectors with a length of $2^N$ using a bitmap algorithm.

In some embodiments, the conversion unit 802 and the determination unit 803 may be further configured to: determine a plurality of similar document sets based on a plurality of predefined conversion rules, wherein the plurality of predefined conversion rules respectively extract a plurality of non-overlapped consecutive N bits from the corresponding binary sequence to obtain the corresponding vector.

In some embodiments, the determination unit 803 may be further configured to: determine the similar document subset that are more accurate than the similar document set by directly comparing the set of words associated with a document from the similar document set with the set of words associated with the target document. In some embodiments, the determination unit 803 may be further configured to: determine a document set having a difference less than the predetermined threshold as the similar document set. In some embodiments, the determination unit 803 may be further configured to: determine, based on the vector of the target document and the predetermined threshold, a value interval of vectors conforming the predetermined threshold; and determine a set of documents with vectors falling into the value interval as the similar document set.

In some embodiments, the apparatus 800 may further comprise an increasing unit 806. The increasing unit 806 may be configured to increase the predetermined threshold by a step of one, such that the similar document set comprises a predetermined number of documents.

In some embodiments, the apparatus 800 may further comprise an adding unit 807. The adding unit 807 may be configured to add vectors into an index segment of a search engine to search the vectors through the search engine.

Figure 9:
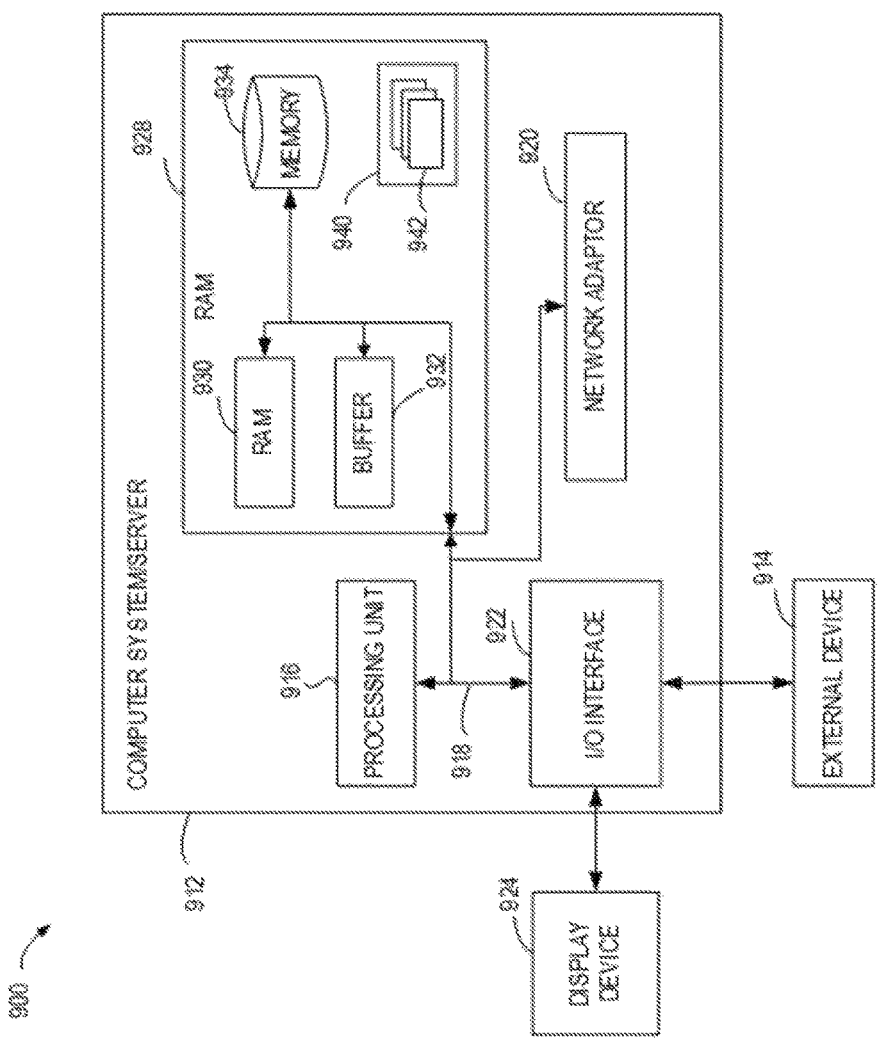
FIG. 9 schematically shows a block diagram of an exemplary computer system/server for implementing the embodiments of the present disclosure.

FIG. 9 schematically shows a block diagram of an exemplary computer system/server 912 for implementing embodiments of the present disclosure. It should be noted that the computer system/server 912 as shown in FIG. 9 is only an example, and it does not limit the function or the scope of the implementation of the present disclosure.

As shown in FIG. 9, the computer system/server 912 is presented in a form of general purpose computer device. The components of the computer system/server 912 may comprise but not be limited to: one or more processors or processing units 916, a system memory 928, a bus 918 connecting different system components (including the system storage 928 and the processing units 916).

The bus 918 represents one or more of several types of the bus structures, including a memory bus or a memory controller, a peripheral bus, a graphics acceleration port, a processor or a local bus using any bus structure of the plurality of bus structures. For example, these architectures include but are not limited to an Industrial Standard Architecture (ISA) bus, a Micro Channel Architecture (MCA) bus, an enhanced ISA bus, a Video Electronics Standards Association (VESA) local bus and a Peripheral Component interconnect (PCI) bus.

The computer system/server 912 typically comprises a plurality of types of computer system readable medium. These medium may be any available medium being accessible by the computer system/server 912, including volatile and non-volatile medium, and removable and irremovable medium.

The system memory 928 may comprise a computer system readable medium in a form of a volatile memory, for example, memory 930 and/or buffer 932. The computer system/server 912 may further comprise other removable or irremovable, and volatile/non-volatile computer system storage medium. Though not shown in FIG. 9, there may be provided a magnetic disk for reading and writing removable non-volatile magnetic disk (for example "floppy disk"), and an optical disk for reading and writing removable non-volatile optical disk (for example, CD-ROM, DVD-ROM or other optical medium). In these cases, each magnetic disk may be connected to the bus 918 via one or more data medium interface. The memory 928 may comprise at least one program product, the program product comprises a group of (e.g. at least one) program modules which are configured to perform the function of the implementation of the present disclosure.

The program/utility 940 including at least one program module 942 may be stored in for example a memory 928, and such program module 942 includes but is not limited to: an operation system, one or more application programs, other program modules and program data, and each of or a certain of combination in these examples may include implementation of the network environment. The program module 942 usually performs the function and/or the method in the implements described in the present disclosure.

According to needs, the computer system/server 912 may communicate with one or more external devices (such as a display device 924, a memory device 914, etc.), may further communicate with one or more devices that enable a user to interact with the computer system/server 912, and/or may communicate with any device (such as network card, a modulator, etc.) that enable the computer system/server 912 to communicate with one or more other computing devices. Such communication may be proceeded via an input/output (I/O) interface 922. Moreover, the computer system/server 912 may communicate with one or more network (such as a local area network (LAN), a wide area network (WAN) and/or public network, such as Internet) via a network adapter 920. As shown in the figure, the network adapter 920 communicates with other modules of the computer system/server 912 via the bus 918. It should be appreciated that, though not shown in the figure, other hardware and/or software modules, which include but are not limited to: microcode, a device disk, a redundant processing unit, an external disk drive array, a RAID system, a tape disk, a data backup storage system, etc., may be used in conjunction with the computer system/server 912.

In the description of the embodiments of the present disclosure, the term "comprise/include" or similar expressions should be interpreted as open inclusion, i.e., "comprise/include but are not limited to". The term "based on" should be interpreted as "at least partly based on". The term "one embodiment" or "the embodiment" should be interpreted as "at least one embodiment".

It should be noted that the embodiments of the present disclosure may be implemented through hardware, software, or combination of software and hardware. The hardware part may be implemented using a dedicated logic; the software part may be stored in a memory, and may be executed by an appropriate instruction execution system, for example, a microprocessor or dedicated design hardware. Those skilled in the art may understand that the aforementioned apparatus and method may be implemented using computer executable instructions and/or by being included in processor control code, for example, such code is provided on the programmable memory or a data carrier, such as an optical carrier or an electronic signal carrier.

Besides, although the operations of the method of the present disclosure are depicted in a particular order in the drawings, it does not necessarily require or imply that to achieve a desired result, such operations should be executed according to the specific order, or all of the illustrated operations have to be executed. In contrast, the blocks depicted in the flow chart may change the execution order. Additionally or alternatively, some blocks may be omitted, and a plurality of blocks may be combined as one block to be performed, and/or one block may be divided into a plurality of blocks to be perform. It should also be noted that the features and functions of two or more apparatus according to the present disclosure may be embodied in one apparatus. On the contrary, the feature and functions of one apparatus depicted above may be further divided into a plurality of apparatuses to be embodied.

Though the present disclosure has been described with reference to a number of specific embodiments, it should be understood that the present disclosure is not limited to the disclosed specific embodiments. The present disclosure intends to cover all modifications and equivalent arrangements within the spirits and scope of the appended claims.

What is claimed is:

1. A computer-implemented method, executed by one or more computing devices, for determining a similar document set to a target document from a plurality of documents, each of the plurality of documents and the target document including a plurality of words, each of the words corresponding to a different integer, the method comprising:

for each document among the plurality of documents and the target document,
obtaining a set of integers associated with the document based on a set of words associated with the document, including extracting keywords associated with the document to generate a set of words associated with the document, and converting the set of words associated with the document to the set of integers, and
converting, based on a predefined conversion rule, the set of integers associated with the document into a vector with a same dimension to provide a fingerprint of the document; and
determining the similar document set based on differences between the vector for the target document and the respective vectors for the plurality of documents.

2. The method computer-implemented according to claim 1, further comprising:
determining a plurality of similar document sets based on a plurality of predefined conversion rules; and
determining an intersection of the plurality of similar document sets as a resulting similar document set.

3. The method computer-implemented according to claim 2, further comprising:
storing a plurality of vectors for each document from the plurality of documents with a multi-dimensional vector matrix, the plurality of vectors being obtained based on the plurality of predefined conversion rules, each of the predefined conversion rules corresponding to a different dimension of the vector matrix, and each vector corresponding to a coordinate value in the corresponding dimension.

4. The method computer-implemented according to claim 3, further comprising:
obtaining a plurality of vectors for a new document based on the plurality of predefined conversion rules; and
storing the obtained plurality of vectors in the vector matrix.

5. The method computer-implemented according to claim 4, further comprising:
marking coordinate values in each dimension of the vector matrix as null except coordinate values corresponding to the vectors for a document.

6. The method computer-implemented according to claim 5, further comprising:
skipping the coordinate values of the vector matric marked as null in determining the similar document set.

7. The method computer-implemented according to claim 3, further comprising:

storing the vector matrix with a hash map.

8. The method computer-implemented according to claim 1, wherein converting the set of integers into the vector based on the predefined conversion rule comprises:
obtaining a corresponding binary sequence for each integer in the set of integers;
extracting consecutive N bits from the corresponding binary sequence, N being an integer greater than zero;
converting the consecutive N bits into a decimal number, the decimal number being used to replace the corresponding integer to form an updated set of integers; and
converting the updated set of integers into a bit vector with a bit length $2^N$ using a bitmap algorithm.

9. The method computer-implemented according to claim 8, further comprising:
determining the plurality of similar document sets based on a plurality of predefined conversion rules, a plurality of non-overlapped consecutive N bits being extracted from the corresponding binary sequence to form the bit vector based on the plurality of predefined conversion rules.

10. An apparatus comprising a computing device for determining a similar document set to a target document from a plurality of documents, each of the plurality of documents and the target document including a plurality of words, each of the words corresponding to a different integer, the apparatus comprising:
an obtaining unit configured to, for each document among the plurality of documents and the target document, obtain a set of integers associated with the document based on a set of words associated with the document, including extracting keywords associated with the document to generate a set of words associated with the document, and converting the set of words associated with the document to the set of integers;
a conversion unit configured to, for each document among the plurality of documents and the target document, convert the set of integers associated with the document into a vector with a same dimension based on a predefined conversion rule to provide a fingerprint of the document; and
a determination unit configured to determine the similar document set based on differences between the vector for the target document and the respective vectors for the plurality of documents.

11. The apparatus according to claim 10, wherein the determination unit is further configured to:
determine a plurality of similar document sets based on a plurality of predefined conversion rules; and
determine an intersection of the plurality of similar document sets as a resulting similar document set.

12. The apparatus according to claim 11, further comprising:
a storage unit configured to store a plurality of vectors for each document from the plurality of documents with a multi-dimensional vector matrix, the plurality of vectors being obtained based on the plurality of predefined conversion rules, each of the predefined conversion rules corresponding to a different dimension of the vector matrix, and each vector corresponding to a coordinate value in the corresponding dimension.

13. The apparatus according to claim 12, wherein the conversion unit is further configured to obtain a plurality of vectors for a new document based on the plurality of predefined conversion rules; and
wherein the storage unit is further configured to store the obtained plurality of vectors in the vector matrix.

14. The apparatus according to claim 13, further comprising:
a marking unit configured to mark coordinate values in each dimension of the vector matrix as null except coordinate values corresponding to the vectors for a document.

15. The apparatus according to claim 14, wherein the determination unit is further configured to:
skip the coordinate values of the vector matric marked as null in determining the similar document set.

16. The apparatus according to claim 12, wherein the storage unit is further configured to:
store the vector matrix with a hash map.

17. The apparatus according to claim 10, wherein the conversion unit is configured to:
obtain a corresponding binary sequence for each integer in the set of integers;
extract consecutive N bits from the corresponding binary sequence, N being an integer greater than zero;
convert the consecutive N bits into a decimal number, the decimal number being used to replace the corresponding integer to form an updated set of integers; and
convert the updated set of integers into a bit vector with a bit length $2^N$ using a bitmap algorithm.

18. The apparatus according to claim 17, wherein the conversion unit and the determination unit are further configured to:
determine the plurality of similar document sets based on a plurality of predefined conversion rules, a plurality of non-overlapped consecutive N bits being extracted from the corresponding binary sequence to form the bit vector based on the plurality of predefined conversion rules.

19. The apparatus according to claim 17, wherein the bit length is an integer multiple of eight.

20. The apparatus according to claim 10, wherein the determination unit is further configured to:
determine a similar document subset that is more accurate than the similar document set by directly comparing the set of words associated with a document from the similar document set with the set of words associated with the target document.

* * * * *